B. LIBERMAN, W. M. REICHART & J. C. WOBENSMITH.
TOBACCO STRIPPING AND BOOKING MACHINE.
APPLICATION FILED AUG. 2, 1913.

1,239,115.

Patented Sept. 4, 1917.
5 SHEETS—SHEET 4.

WITNESSES
Mae Hofmann
Daniel Webster Jr.

INVENTORS.
Bernard Liberman.
William M. Reichart.
James C. Wobensmith.
ATTORNEY

UNITED STATES PATENT OFFICE.

BERNARD LIBERMAN, WILLIAM M. REICHART, AND JAMES C. WOBENSMITH, OF PHILADELPHIA, PENNSYLVANIA; SAID REICHART AND SAID WOBENSMITH ASSIGNORS TO SAID LIBERMAN.

TOBACCO STRIPPING AND BOOKING MACHINE.

1,239,115.      Specification of Letters Patent.      Patented Sept. 4, 1917.

Application filed August 2, 1913. Serial No. 782,586.

*To all whom it may concern:*

Be it known that we, BERNARD LIBERMAN, WILLIAM M. REICHART, and JAMES C. WOBENSMITH, all citizens of the United States, residing in Philadelphia, in the county of Philadelphia and State of Pennsylvania, have jointly invented certain new and useful Improvements in Tobacco Stripping and Booking Machines, of which the following is a specification.

Our invention relates to tobacco stripping and booking machines, that is to say, to machines for removing the stems from tobacco leaves and piling the stripped leaves in flat orderly condition for subsequent use in the manufacture of cigars and other tobacco products. Our invention comprises means for "butting" the stem some distance from the point of the leaf, and thereafter pulling the stem from the leaf with a smooth uniform motion, whereby waste will be largely eliminated. By such means very little of the useful portions of the leaf will be separated therefrom. Our invention further comprises the method and means whereby the usual hand method of stripping tobacco leaves is simulated, but whereby a better result is obtainable on account of the more uniform and efficient action of said means.

It should be understood that where the mid-rib or main stem of the tobacco leaf toward its outer end is small relatively, that is to say, where it is no larger than the branch ribs, the same may be permitted to remain in the manufactured product. This fact has been recognized in the hand method of stripping tobacco, but has apparently been ignored in machines designed and operated for stemming tobacco leaves.

The object of our invention therefore is to provide method and means for stripping and booking tobacco leaves, in which waste is eliminated, and which result in a more uniform product than heretofore is obtained. In this connection our invention comprises improved means for "butting" the stem some distance from the end of the leaf, that is to say, for severing the stem at this point, and then gripping the same and pulling it from the leaf with a smooth uniform motion, a considerable portion of the leaf meanwhile being firmly held and supported, and the stripped leaf being finally delivered to a booking drum where it is piled upon the previously stripped leaves in a smooth orderly condition.

Referring to the drawings, which illustrate merely by way of example, means for realizing our invention—

Figures 5, 6:
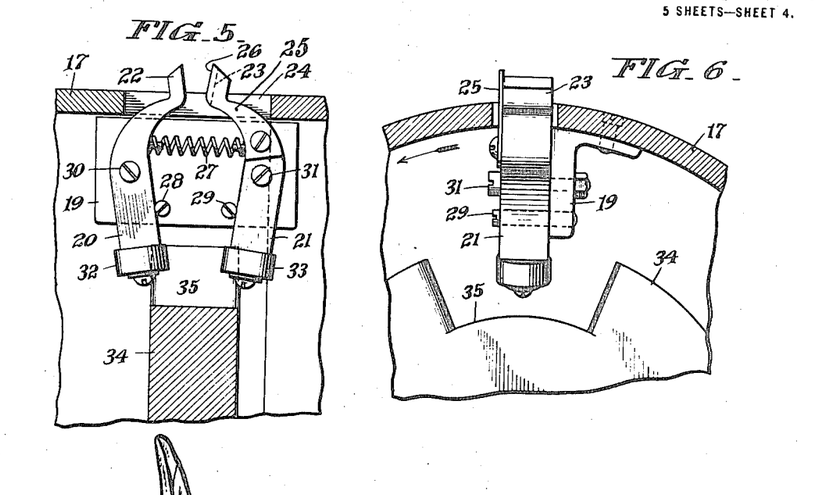
Figs. 5 and 6 are fragmentary detail views illustrating the mechanism for butting and gripping the stem for removing the same from the leaf.

Referring to the drawings, in the particular embodiment of our invention therein shown, 15, 15 are the side frames of the machine, suitably connected by certain stationary shafts and rods which will hereinafter be fully described. The stationary shaft 16 extends from one of said frames to the other. Upon this shaft 16 is journaled a drum 17, preferably made in two parts, so as to be longitudinally separable to permit access to the butting and gripping mechanism mounted therein. Secured to the hub of each of said sections of the drum 17 is a gear wheel 18 serving as means for rotating said drum in unison with the other parts of the machine. Mounted on the interior of the drum 17 is a bracket 19 (see Figs. 5 and 6) upon which bracket the gripping members 20 and 21 are pivoted. The gripping members 20 and 21 are provided with gripping jaws 22 and 23 respectively. These jaws project through an aperture 24 in the periphery of the drum. The jaws 22 and 23 are inclined or beveled at their outer extremities, so that the leaf to be stripped may be readily forced upon the same with the stem or rib between the gripping surfaces and the jaws projecting through ruptures in the leaf. The gripping member 21 is also provided with a knife 25, the cutting edge 26 of which co-acts with the edge of the gripping jaw 22 to sever or cut the stem or rib of the leaf when the jaws are brought together. A compression spring 27 mounted between the gripping members 20 and 21 above the pivots 30 and 31 thereof, serves to open the jaws of said gripping members at the proper time, and stop pins 28 and 29 limit the extent of said opening. The inner ends of the gripping members 20 and 21 are provided with rollers 32 and 33, adapted to engage the cam plate 34, during the rotation of the drum in the operation of the machine. The cam plate 34 is fixedly mounted on the stationary shaft 16 and has a recess or cut out portion 35 to permit the opening of the jaws of the gripping members at the proper time in the rotation of the drum 17.

Arranged preferably above the stationary shaft 16 is a rotatable shaft 40 journaled in the side frames 15 and having mounted thereon a drum 41, preferably smaller in diameter than the diameter of the drum 17. This drum 41 is provided with a peripheral groove 42 centrally disposed thereon. Gears 43 secured to said shaft 40 and meshing with gears 18 serve to cause the drums 41 and 17 to rotate with a uniform peripheral speed. The shaft 40 is also provided at one end with a gear 44, which meshes with and is driven by an idler gear 45 which in turn meshes with and is driven by a gear 46, which is mounted on the end of the shaft 50, which is the main driving shaft of the machine and also serves as the shaft for the support of the booking drum 51.

The shaft 50 is preferably arranged above and to the rear of the stripping drum 17 and as before stated the booking drum 51 is mounted thereon and rotates in unison therewith.

A series of parallel belts 60 pass over the drum 17 thence under and around the drum 41 to a point above the horizontal axis of said drum thence extending over an idler roller 61 and thence to and around the booking drum 51. The belts 60 then pass around an idler roller 62 which is journaled in the free ends of pivoted brackets 63 which are mounted on a rod 64. Rod 64 is supported at its ends in slots 65 in the side frames 15. These slots 65 extend radially from the axis of the booking drum 51. The rod 64 also serves as a support for an idler roller 66 over which the belts 60 pass after leaving the roller 62. The belts then pass over another idler roller 67, which is mounted on a spindle 68. Spindle 68 is supported in slots 69 in the side frames 15. These slots 69 also extend radially from the axis of the booking drum 51. The belts 60 then pass down and around individual idler pulleys 70, each of which is journaled on a separate stud 71, supported in a pivoted bracket 72, pivoted on a stationary rod 73, which extends from one side frame 15 to the other. Brackets 72 are provided with ears 74 to prevent the individual pulleys 70 from fouling on each other when the slack of the separate belts 60 is taken up by the weight of said pulleys and the brackets 72 in which they are mounted. After passing around the pulleys 70 the belts 60 extend to the drum 17. A plurality of relatively narrow belts are preferably provided. There may however be but two belts one on each side of the middle part of the machine. In any event the space between the two continguous edges of the belts at the middle part of the machine is made as small as possible so as to support and hold the leaf close to the stem, while the same is being pulled from the leaf. In the operation of the machine the projecting jaws 22 and 23 of the gripping members 20 and 21 pass between these contiguous edges of the belts at the center of the machine.

Mounted in front of the idler roller 61 and bearing against the drum 41 is a cylindrical brush 80, the spindle 81 of which is journaled in the side frames 15. The purpose of the brush 80 is to prevent the tobacco leaves from adhering to the drum 41, and to guide the same around the roller 61 along with the carrying belts 60, so that the leaves will be piled upon the booking drum superposed upon each other. The spindle 81 also carries a gear 82, which meshes with and is driven by a gear 83, which in turn meshes with and is driven by a gear 84, mounted on and secured to the main shaft 50.

It is desirable that the machine be automatically stopped in an initial position and also in a secondary position after a slight preliminary movement, at each revolution of the main shaft, so as to bring the gripping and butting mechanism to the proper position with respect to the operator, and also to cause the tobacco leaves to be booked one immediately over the other upon the booking drum 51. For this purpose the driving pulley 90 is loosely mounted upon the shaft 50 and is provided with an internally toothed ratchet wheel 91, the teeth 92 of which are adapted to engage and transmit the motion through a pawl 93, which is pressed outwardly into engagement with said teeth by means of a spring 94 and which is pivoted as at 95 to a sleeve bracket 96 which is fixedly mounted on the main shaft 50. The spring controlled pawl 93 is provided with a heel portion 97, which is engaged by the end of a set screw 98 which is carried by a lug 99 extending from a plate 100 which is also loosely mounted on the shaft 50. The plate 100 is arranged to have a limited range of movement with respect to the sleeve bracket 96, being limited in one direction by the set screw 98 bearing against the heel 97 of the pawl 93 and being limited in the other direction by a lug 130 which extends from plate 100 and normally bears against a lug 131 which extends from the sleeve bracket 96. The arrangement is such that when the motion of the plate 100 is stopped and the sleeve bracket 96 continues to rotate, the heel 97 of pawl 93 bearing against the end of the set screw 98 will cause the pawl to be disengaged from the teeth 92 of the ratchet 91.

For the purpose of stopping the machine automatically at each revolution of the main shaft 50, a circular plate 102 is secured to the plate 100 and said plate 102 is provided with a notch 103 in its periphery. A pawl 104 is pivoted as at 135 to one of the side frames 15 and has its free end normally bearing against the periphery of the plate 102. Pivoted near the free end of the pawl 104 is a connecting rod 105 which is pivoted at its lower end as at 106 to an arm 107 which extends from a sleve 108, which sleeve is rotatably mounted upon a stationary rod 109 and is provided with a foot treadle 110 for the purpose of arbitrarily releasing the pawl 104 from engagement with the notch 103 when it is desired to start the machine. To keep the end of the pawl 104 normally bearing against the periphery of the plate 102 there is provided a spring 111, which is connected at one end to a stud 112 extending from the connecting rod 105 and having its other end connected to a suitable portion of one of the stationary frames 15.

Where it is desired to provide for a secondary stop after a slight preliminary movement in order to get the leaf properly directed between drums 17 and 41 before pressing the nipper elements through the leaf a second notch in the periphery of plate 102 is adapted to coöperate with pawl 104 in substantially the same way as described in respect to notch 103.

For the purpose of permitting the operator to arbitrarily stop and start the machine at various periods during the operating of the same, there is also provided a toothed wheel 115 which is also fixedly secured to the plates 100 and 102 preferably by means of rivets 116. A bell crank pawl 117 is pivoted as at 118 to one of the side frames 15 with its other end normally out of engagement with the toothed wheel 115, and a connecting rod 119 is pivotally connected to the other arm of the bell crank pawl 117 and extends downward and is pivotally connected as at 120 to an arm 121, extending from a foot treadle 122, which is pivotally mounted on the bar 109. To maintain the bell crank pawl 117 normally out of engagement with the toothed wheel 115 there is provided a spring 123 having one end connected to a stud 124 extending from the connecting rod 119 and having its other end connected to a suitable portion of one of the side frames 15.

Figure 1:
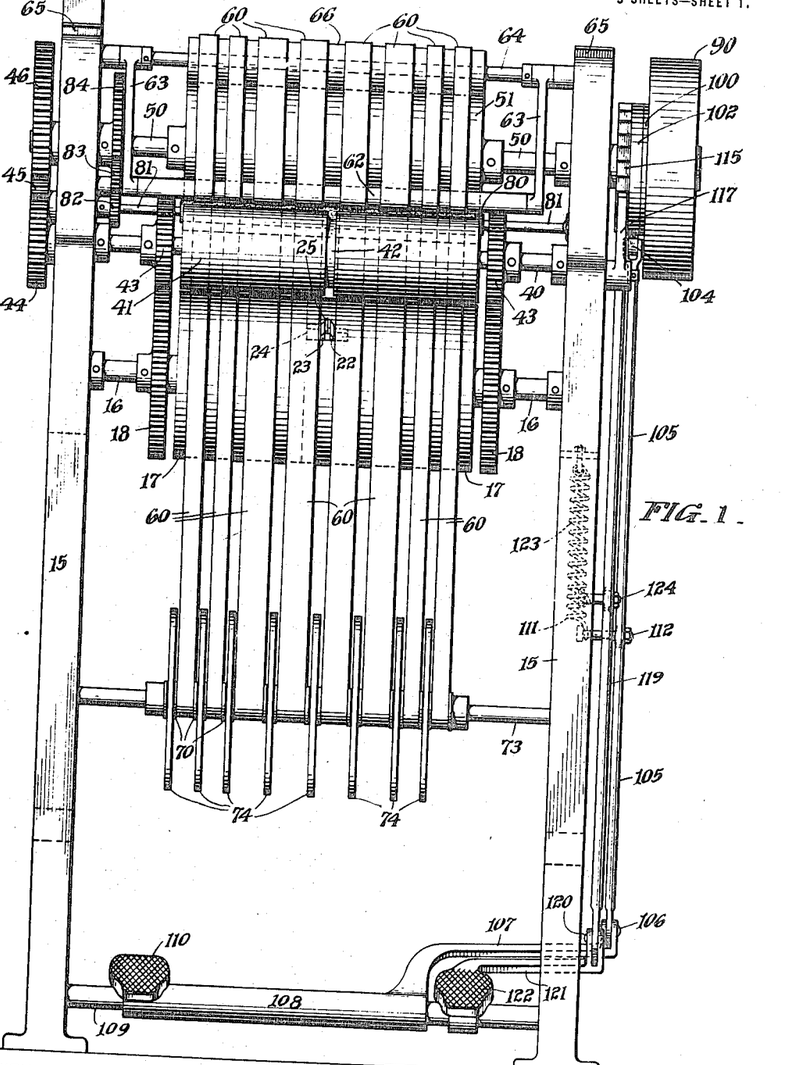
Figure 1 is a front elevation of a tobacco stripping and booking machine embodying the main features of our present invention.
Figure 2:
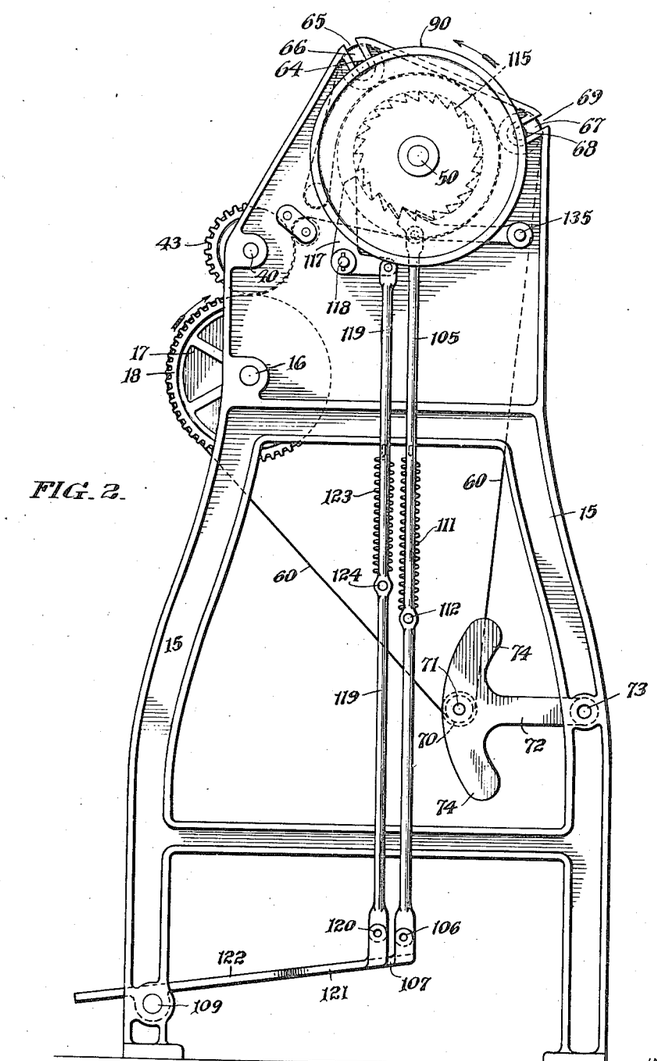
Fig. 2 is a side elevation thereof.
Figures 3, 4:
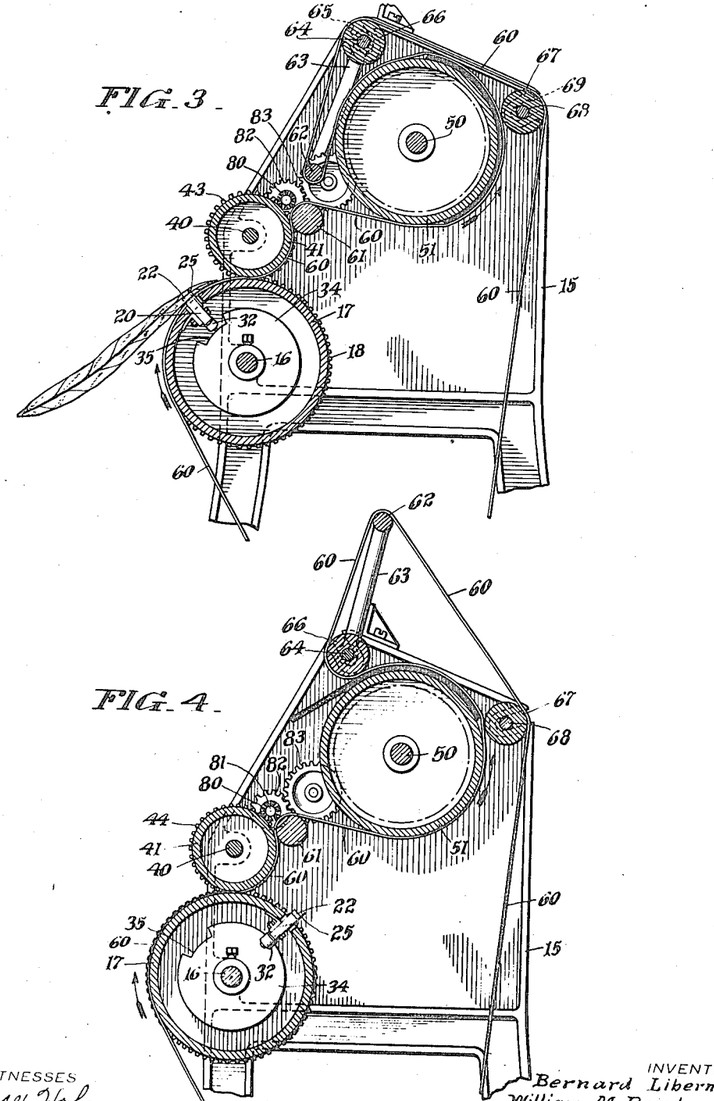
Fig. 3 is a vertical transverse section of the upper portion of the machine illustrating the main operating parts thereof in the normal initial position at the beginning of the operation of stripping a leaf.
Fig. 4 is a similar view but with the parts shown in the positions assumed when a book of leaves is being removed from the machine.
Figure 7:
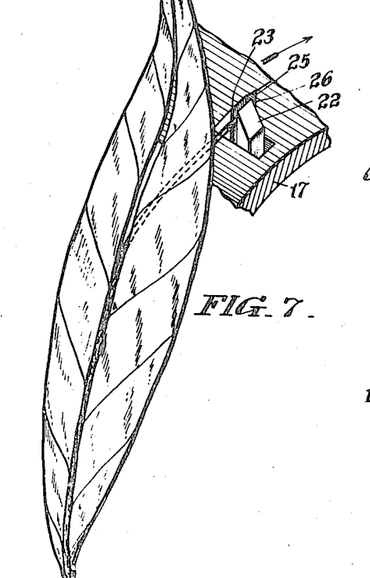
Fig. 7 is a perspective view of a leaf in the process of being stripped with the stem thereof shown in operative relationship to the butting and gripping mechanism.
Figure 8:
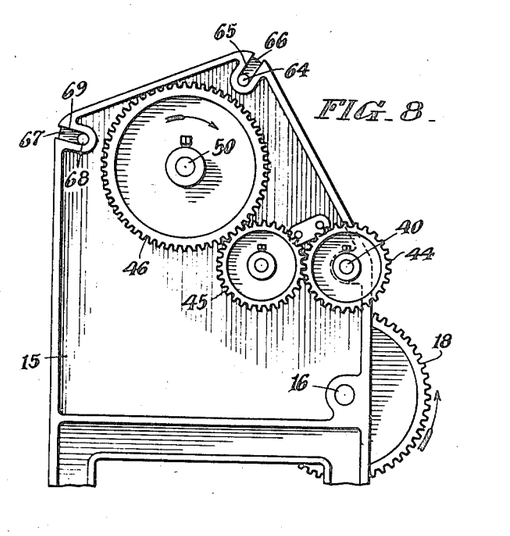
Fig. 8 is an end elevation of the upper portion of the machine showing the end thereof opposite to that shown in Fig. 2.
Figures 9, 10:
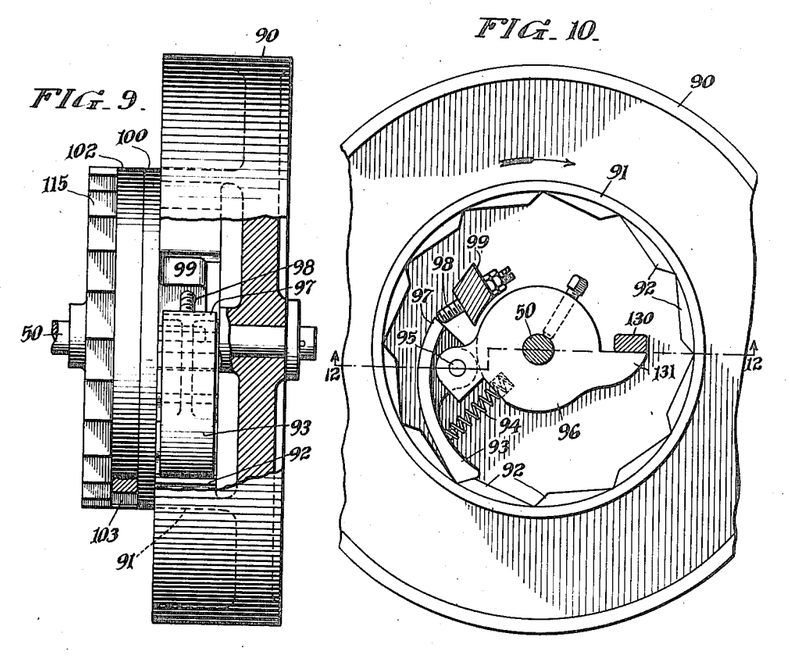
Figs. 9 to 12 are detail views of the clutch mechanism for automatically stopping the machine at each revolution of the main shaft thereof as well as permitting the same to be arbitrarily stopped and started by the operator when desired.
Figure 11:
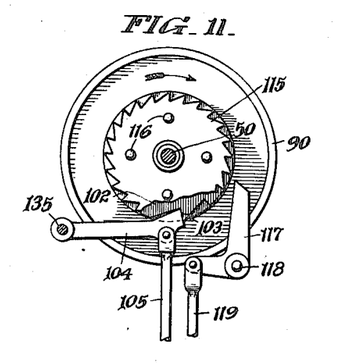
Figure 12:
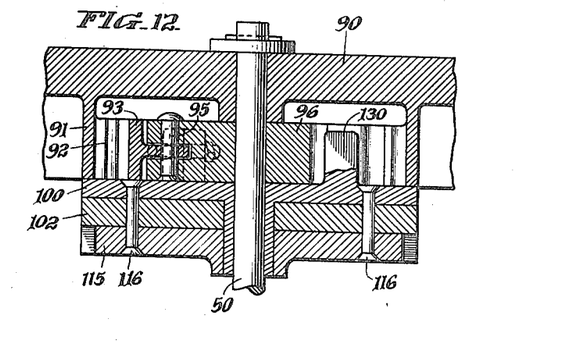

The operation of the machine will now be described. With the exception of Figs. 7, 9 and 10 the various parts of the machine are illustrated in the initial inert or starting position. The operator takes the leaf, suitably dampened, from the "hand" and primarily spreads the same at the point where the butting is to take place and directs the point of the leaf between drums 17 and 41, preferably, but not necessarily, utilizing a slight preliminary movement of the machine to secure the point of the leaf between the said drums. The leaf is then forced downward by the operator with the stem or mid-rib between the jaws of the gripping members 20 and 21. The operator then depresses the inner end of the foot treadle 110, causing the connecting rod 105 to be depressed against the tension of the spring 111 and pulling the free end of the pawl 104 out of engagement with the notch 103, thus permitting the bracket member 96 to rotate slightly relative to the plate 100 on account of the tension of the spring 94 bearing against the free end of pawl 93 and thereby permitting said pawl 93 to engage one of the teeth 92 of the ratchet 91 which is carried by the continuously driven main pulley 90. The motion of the pulley will thus be transmitted through the pawl 93 to the bracket 96 and thus to the main shaft 50, causing the various parts of the machine to rotate in unison on account of the gear connections as hereinbefore described. As the drum 17 is thus set in rotation the rollers 32 and 33 on the inner ends of the gripping members 20 and 21 will encounter a solid portion of the cam plate 34 and the outer gripping jaws 22 and 23 of the members 20 and 21 will be closed, the stem being severed by the cutting teeth 26 of the knife 25 and the severed stem being firmly gripped between the jaws 22 and 23. As the drum 17 continues to rotate the leaf proper will pass between the belts 60 and the surface of the drum 41 and be carried abruptly upward, whereas the stem will be wrapped around the drum 17 and will pass in the general downward direction of the rear surface of said drum 17 causing the stem to be pulled from the leaf. It will be noted that the leaf is firmly clamped between the belts 60 and the drum 41, on both sides of the stem close to the point where the same is being severed, the operator usually spreading and guiding the leaf and keeping the stem centrally located as the leaf passes between the drums. As the drum 17 continues to rotate to the starting position, and the rollers 32 and 33 pass to the notch 35 in the cam 34, the jaws 22 and 23 will open and release the stem which will fall down to the front of the machine, whence it may if desired be guided off by a suitable chute or apron, not shown. As the drum 41 continues to rotate, the stripped leaf is firmly clamped between the belts 60 and the surface of said drum 41, and will be carried upward to the point where the belts leave the drum 41 and pass over the idler roller 61. The leaves will be guided in that direction along with the belts 60 by the continuously rotating brush 80, and will be piled upon the booking drum one immediately above the other. When a sufficient number of leaves have accumulated on the booking drum 51, the brackets 63 may be swung outwardly and upwardly, as shown in Fig. 4, and the machine rotated through one revolution to free the accumulated book of leaves.

When it is desired arbitrarily to stop the machine, at any period of its revolution, the inner end of the foot treadle 122 is depressed to cause the free end of the bell crank 117 to engage one of the teeth of the wheel 115 thereby arresting the movement of the same and causing the set screw 98 to bear more strongly against the heel 97 of pawl 93 to disengage the free end of said pawl from the ratchet teeth 92. When it is desired to re-start the machine from such an intermediate position, the foot treadle 122 is released, whereupon the spring 123 will cause the pawl 117 to disengage from the wheel 115 and permit the pawl 93 to again engage the teeth 92 of the ratchet 91 and the machine will continue its action to the end of a revolution of drum 17.

By the use of the term "flanking" in the following claims I mean to indicate that the clamping means engages the leaf on each side of the stem only, and does not engage the stem as would be the case where the leaf is clamped or pressed between two parallel rollers extending transverse the path of travel of the leaf.

What we claim is:—

1. In a device for stemming tobacco the combination of a drum and coöperating belts for clamping the leaf on both sides of the stem and means for then deflecting the stem from the adjacent clamped leaf sections.

2. In a device for stemming tobacco the combination of a drum and coöperating belts for clamping the leaf on both sides of the stem and means for then stripping the stem therefrom.

3. In a device for stemming tobacco the combination of a drum and coöperating belts for clamping the leaf on both sides of the stem and means for then guiding the leaf sections and the stem in divergent paths of travel.

4. In a device for stemming tobacco the combination of a drum and coöperating belts for clamping the leaf on both sides of the stem and means for severing the stem toward the small end or point of the leaf and means for then deflecting the stem from the adjacent clamped leaf sections.

5. In a device for stemming tobacco the combination of a drum and coöperating belts for clamping the leaf on both sides of the stem, means for severing the stem toward the small end or point of the leaf and means for then guiding the leaf with pointed end forward, and the stem in divergent paths of travel.

6. In a device for stemming tobacco the combination of a drum and coöperating belts for clamping the leaf on both sides of the stem, means for severing the stem toward the small end or point of the leaf, and means for then guiding the leaf and the stem in divergent paths of travel to separate the stem from adjacent leaf sections from a point toward the small end of the leaf to the base thereof.

7. Means for stemming tobacco comprising a drum and coöperating flanking tapes for clamping the leaf to the drum on both sides of the stem, and means for gripping the stem and drawing the same from the adjacent clamped portions.

8. In a tobacco stemming machine, clamping means comprising a drum and coöperating belts for clamping the leaf on both sides of the stem, means for gripping the stem, means for moving the clamping means from the gripping means and means for automatically stopping the machine at two predetermined points in each cycle of operation.

9. In a tobacco stemming machine, clamping means comprising a drum and coöperating belts for clamping the leaf on both sides of the stem, means for gripping the stem, means for moving the clamping means from the gripping means, means for automatically stopping the machine at a point suitable for bringing the leaf into proper initial position, and automatic means for again stopping the machine after a preliminary movement thereof sufficient to engage the leaf.

10. A drum provided with an automatically actuated stem gripper, a coöperating drum and flanking tapes for clamping the leaf thereto, while the gripper draws the stem therefrom, and automatic means for stopping the machine at a required point in each cycle of operation.

11. A tobacco stemming machine comprising a drum carrying a stem gripper, a fixed cam for actuating the gripper as the drum rotates, a coöperating drum and flanking clamping tapes for clamping the leaf thereto on both sides of the stem, a booking drum and associated mechanism for receiving and storing the leaves after the stems have been removed therefrom, automatic means for stopping the machine and arbitrarily operated means for starting and stopping the machine.

12. A tobacco stemming machine comprising means for gripping and severing the stem, belts and a coöperating drum for clamping the leaf on both sides of the stem over a considerable portion of its longitudinal extension thereof, and means for actuating the gripping mechanism to pull the stem from the clamped portions of the leaf.

13. A tobacco stemming machine comprising means for gripping and severing the stem, a rotatable drum, flanking belts passing over said drum adapted to hold the leaf thereon, and means for actuating the gripping mechanism to pull the stem from the leaf while the same is held upon said drum by said belts.

14. A tobacco stemming machine comprising two drums arranged contiguous to each other, belts passing over the first drum and then partly around the second drum and adapted to clamp the leaf to the second drum, and stem gripping means carried by the first drum.

15. A tobacco stemming machine comprising means for gripping and severing the stem, a drum and coöperating belts to clamp the leaf over a considerable portion thereof, means for actuating the gripping mechanism to pull the stem from the portion of the leaf so clamped, and means for booking the stemmed leaves.

16. A tobacco stemming machine comprising means for gripping and severing the stem, a rotatable drum, belts passing over said drum adapted to hold the leaf thereon, means for actuating the gripping mechanism to pull the stem from the leaf while the same is held upon said drum by said belts, and means for booking the stemmed leaves.

17. A tobacco stemming machine comprising two stripping drums arranged contiguous to each other, a booking drum, and belts passing over the first drum and then partly around the second drum, clamping the leaf to the second drum and thence extending around said booking drum and a rotating brush for deflecting the leaf to the booking drum.

18. A tobacco stemming machine comprising two stripping drums arranged contiguous to each other, means carried by one of said drums for gripping the stem and pulling the same from the leaf, and belts passing over the other of said drums to hold a considerable portion of the leaf while the stem is being pulled therefrom.

19. A tobacco stemming machine comprising two stripping drums arranged contiguous to each other, means carried by one of said drums for gripping the stem and pulling the same from the leaf, flanking belts passing over the other of said drums to hold a considerable portion of the leaf while the stem is being pulled therefrom, and means for booking the stemmed leaves.

20. In a tobacco stemming machine, a drum, coöperating belts for clamping the leaf to the drum on both sides of the stem, means for gripping the stem to pull the same from the leaf, means for automatically stopping the machine when said gripping mechanism occupies a predetermined position, and means for arbitrarily stopping and starting the machine in intermediate positions.

21. A tobacco stemming machine comprising two stripping drums arranged contiguous to each other, a booking drum, belts passing over the first drum and then partly around the second drum to clamp the leaf thereto and thence around said booking drum, and means for deflecting the leaf toward the booking drum.

22. A tobacco stemming machine comprising two stripping drums arranged contiguous to each other, a booking drum, belts passing over the first drum and then partly around the second drum clamping the leaf thereto and thence extending around said booking drum, and means for guiding the leaf along with said belts to the booking drum, said means comprising a rotating brush bearing against the second of said stripping drums adjacent the place where said belts leave said drum.

23. In a tobacco stripping machine, a pair of stripping drums, mechanism for gripping the stem and pulling the same from the leaf carried by one of said drums, and two or more belts passing over the other of said drums to hold a considerable portion of the leaf while the stem is being pulled therefrom, the edges of the belts at the center of the machine being closely located to hold the leaf close to the stem at the point the same is being pulled from the leaf.

24. In a tobacco stripping machine, a pair of stripping drums, mechanism for gripping the stem and pulling the same from the leaf carried by one of said drums, and two or more belts passing over the other of said drums to hold a considerable portion of the leaf while the stem is being pulled therefrom, the edges of the belts at the center of the machine being closely located to hold the leaf close to the stem at the point the same is being pulled from the leaf, and the jaws of the gripping mechanism being arranged to pass between said edges of the belts.

BERNARD LIBERMAN.
WILLIAM M. REICHART.
JAMES C. WOBENSMITH.

Witnesses:
MAE HOFMANN,
JNO. P. CROASDALE.